March 5, 1963 — J. B. YODER — 3,079,774
QUARTZ LAMP SEALING MACHINE CONTROL
Filed April 2, 1959 — 2 Sheets-Sheet 1

Inventor:
Joe B. Yoder,
by Ernest W. Legree
His Attorney.

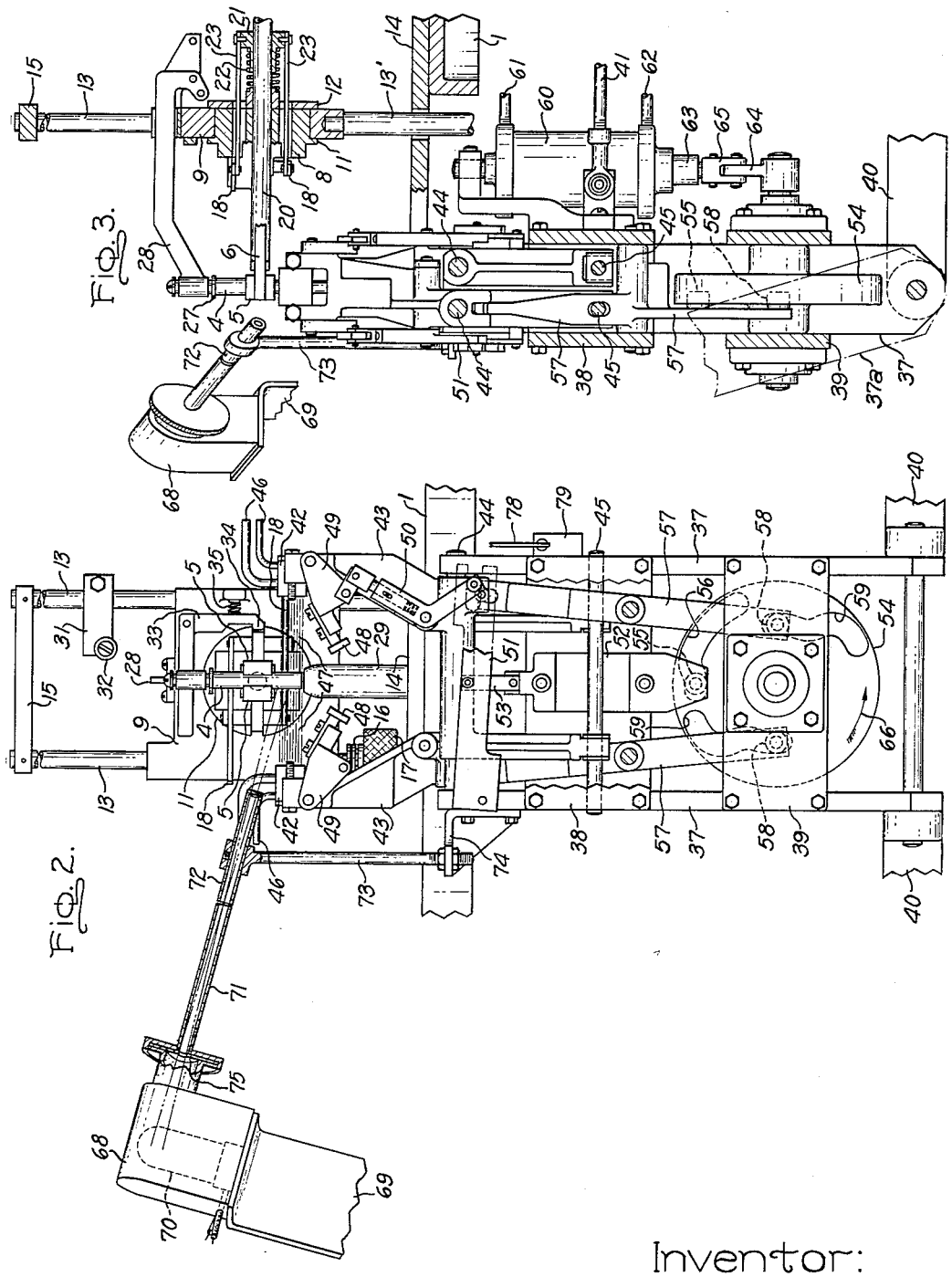

United States Patent Office 3,079,774
Patented Mar. 5, 1963

3,079,774
QUARTZ LAMP SEALING MACHINE CONTROL
Joe B. Yoder, Mayfield Heights, Ohio, assignor to General
Electric Company, a corporation of New York
Filed Apr. 2, 1959, Ser. No. 803,678
5 Claims. (Cl. 65—139)

This invention relates generally to the manufacture of quartz lamps and more particularly to the control of a machine for sealing lead-in conductors through the ends of quartz tubes.

The particular machine for which the specific embodiment of the invention described herein has been made is described and claimed in Patent 2,857,712—Yoder et al. and is intended for sealing the lead-in conductors in the ends of quartz tubes used for high pressure mercury arc discharge lamps. Machines of this general type are also used in the manufacture of quartz tubular heat lamps having a coiled tungsten filament extending through a fused quartz tube. These quartz tube pinch sealing machines comprise an indexing turret having a plurality of work-holding heads each comprising a pivotable chuck which permits rotating the tube end for end to allow successive sealing of both ends. The sealing operation proper is performed at a pinching station where a heating and pinching apparatus, normally tilted out of the path of movement of the heads during rotation of the turret, is pivoted back into encompassing relation with the quartz tube. This apparatus comprises oxyhydrogen burners which heat the lower end of the quartz tube to a plastic state, and a pair of pinching jaws along with an actuating mechanism therefor which pinch or fold shut the end of the tube.

In the operation of the machine up to the present, the heating interval or duration during which the burners are turned on has been controlled by a timer. The timer was preset to operate after a predetermined time interval gauged beforehand as appropriate for the particular size and thickness of quartz tubing desired to be sealed. However it was found in practice that the wall thickness of quartz tubing as obtained from the manufacturers varied too much even in one nominal size to permit the use of a constant heating time interval. In one particular size of quartz arc tube having a nominal diameter of 25 millimeters and a wall thickness of .040", the wall thickness was found to vary in practice from .030" to .052". This spread necessitated heating times varying from 9 to 16 seconds, the heating time for the middle gauge of tubing being about 12 seconds. Also variations in the rate of flow of nitrogen through the quartz tube, for instance due to variations in the size of exhaust tube or due to leakage at the connections to the quartz tube, cause variations in temperature. The temperature requirements at the instant of pinching are quite stringent: too high a temperature results in deformed seals with the electrodes misaligned and split foils wherein the inleads are torn apart; too low a temperature results in a cold pinch with the possibility of cavities resulting in a leaky seal. The tolerance in heating time to avoid these limiting conditions is at most a few seconds. In practice up to now the problem has been handled by gauging the quartz tubing as received from the manufacturers into different lots depending upon the wall thickness. For instance, the tubing might be gauged into five different lots with differences in thickness of about .004" between each lot, and then the timer is set according to the lot. This operation necessarily entrails extra labor and expense and also causes a relatively high percentage of rejects.

The object of the invention is to provide a new and improved control system for determining the heating time interval in conjunction with a quartz tube sealing machine.

A more specific object of the invention is to provide a control system in combination with a quartz lamp sealing machine which will terminate the heating interval and determine the pinching moment appropriate to the arc tube being processed despite substantial variations in the wall thickness of successive arc tubes.

In accordance with the invention, I have discovered that about the temperature of 2000° C. required for the sealing of quartz arc tubes, the radiant energy produced by the quartz in the visible and particularly in the infrared may be used to control a photo-electric pyrometer for ascertaining the correct moment to turn off the heating fires and mold the seal. Rather surprisingly, the pyrometer will ascertain the correct moment despite wide variations in wall thickness of the quartz tubing and with greater accuracy than could be achieved by the gauging method. The accuracy of operation may be further improved by causing the control system to operate in a region where the output of the pyrometer is climbing at a relatively rapid rate as determined by the temperature of the region of the quartz tube being monitored by the pyrometer in conjunction with the spectral response curve of the pyrometer.

For further objects and advantages and for a detailed description of a prefrrred embodiment of the invention, attention is now directed to the following description and accompanying drawing. The features of the invention believed to be novel will be more particularly pointed out in the appended claims.

In the drawings:

FIG. 2 is a vertical front elevation of the pinching apparatus shown in conjunction with a work-carrying head indexed in place.

FIG. 3 is a vertical side elevation, partly in section, corresponding to FIG. 2.

Figure 1:
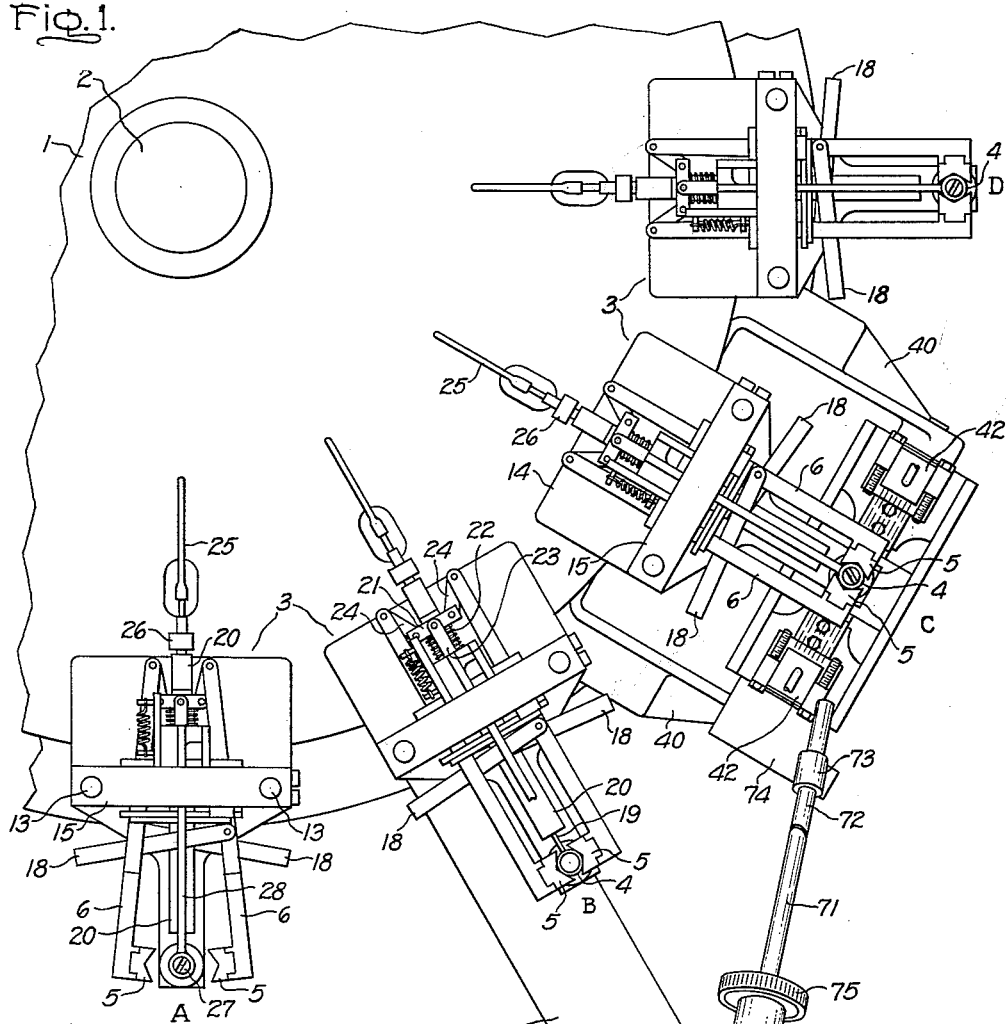
FIG. 1 is a plan view of a segment of the turret of a quartz lamp sealing machine equipped with a control system in accordance with the invention.

Referring to the drawings and more particularly to FIG. 1, there is shown approximately a quarter of a rotary turret 1 borne on a shaft 2 with work-carrying heads 3 disposed about the periphery of the turret at stations A to D. The turret is driven in intermittent fashion so as to index the heads from station to station with a dwell interval at each station in order to permit the operator to load or otherwise adjust the quartz tubes in the heads at loading station A.

The details of the head 3 which accommodate the quartz arc tube 4 are shown principally in FIGS. 2 and 3. The tube is gripped on opposite sides by a pair of jaws 5 on the forward ends of arms 6 pivotally mounted on a rotatable chuck body 8. Chuck body 8 is retained in a circular well in block member 9 by means of overlapping flange portions 11, 12. Block member 9 in turn is slidably mounted on columns 13 extending vertically upward from bed or table member 14 fastened to turret 1 and braced at their upper ends by member 15. Block member 9 normally slides down of its own weight on columns 13 to the lowermost extent permitted by spacers 16 as determined by manually adjustable knurled knob 17.

A quartz tube 4 is loaded into a head by drawing forward the end of one of the hand levers 18 and inserting the laterally projecting exhaust tubulation 19 into the end of sleeve 20 until the tube is centered between the jaws 5. The jaws are shown opened at position A in FIG. 1 and closed about the arc tube at position B. The hand levers spring the arms apart by drawing forward bushing 21 against spring 22 through link 23, the bushing in turn being connected to the inner ends of the arms through links 24. Sleeve 20 also forms part of a port assembly for flushing nitrogen through the quartz tube during heating and pinching in order to prevent oxidation of the inlead and electrode assemblies. Nitrogen is admitted into the system from a supply tube 25 which communicates with a valve collar 26 on the rearward end of sleeve 20. When both ends of the quartz tube are open and the first pinching and sealing of an end is being made, it is necessary to close the upper end in order to prevent rapid loss of the nitrogen flushing gas. For this purpose there is provided a floating stopper 27 on the end of a pivotally mounted arm 28 which may be swung over the quartz tube. The electrode assembly is supported within the lower end of the arc tube 4 by a vertical spindle 29 standing on bed member 14. The precise height of the quartz tube is adjusted by turning knurled knob 17 as required to obtain a slight clearance between the upper face of spindle 29 and the lowermost end of the quartz tube.

After one end of the quartz tube has been sealed the chuck assembly is rotated 180° in block member 9 so as to turn the quartz tube end for end. This is done when the assembly including block member 9 is raised to the upper limit of movement on columns 13 as determined by stop 31. In this position, roller 32 on the stop engages the horizontal portion of L-shaped lever 33 whose vertical portion is provided with a hooked end 34 which is urged by a spring 35 into one of two recesses on diametrically opposite sides of flange 11 on rotatable chuck body 8. The hooked end on the L-shaped lever serves as a latch which normally locks the rotatable chuck body to maintain the quartz tube in vertical alignment but which is released at the upper limit of movement of the block member.

After a quartz tube has been loaded into the head at station A, the head and lamp are indexed successively through the series of work stations. At station B, the nitrogen gas being flushed through the quartz tube completely eliminates any air originally present. At station C, the quartz tube is heated to the fusion point, the heating fires being turned on for intervals determined by the control mechanism including a photoelectric pyrometer in accordance with the present invention. The end of the quartz tube is then immediately pinch sealed by the mechanism. At station D, the quartz tube begins to cool and cooling continues at subsequent stations not shown in the drawing. A reduced flow of nitrogen or other inert gas is maintained at subsequent stations to prevent oxidation of the electrode and lead-in conductor during cooling. The quartz tube next reaches a diametrically opposite station to original station A where it is unloaded if both ends have been sealed, or turned end for end if only one end has yet been sealed in order to permit sealing of the open end through a corresponding series of stations diametrically opposite to those illustrated in FIG. 1.

The heating and pinching mechanism along with the control system are shown at station C in FIG. 1 and in FIGS. 2 and 3. The entire heating and pinching mechanism is mounted on a tilting frame comprising vertical members 37 and transverse plates 38, 39 pivotally mounted on brackets 40 fastened to the frame of the machine. During indexing, the frame is tilted out at an acute angle to the vertical, as shown in broken lines at 37a in FIG. 3, in order to clear the path of movement of the heads. The tilting movement of the frame is effected from the machine drive through link member 41 shown in FIG. 3.

Oxyhydrogen burners 42 are mounted on the bifurcated upper ends of opposed cross heads 43 slidably mounted for horizontal translation on transverse slide bars 44, 45 attached to the tilting frame. The burners are of the premixing type and are supplied with oxygen and hydrogen through flexible hoses coupled to the supply tubes 46. The burners are fixed in position to direct their flames horizontally against the lower end of the quartz tube as indicated at 47 in FIG. 2. For pinch sealing larger sizes of quartz tubing, two additional burners mounted on the tilting frame at right angles to the first two may be provided. The rear burner in such case may be pivotally mounted and arranged to be swung aside when the frame tilts in order to avoid the quartz tube or spindle 29.

Pinching jaws 48 are carried on the ends of brackets 49 pivotally mounted on cross heads 43. During the heating part of the cycle while the burners are turned on, the jaws are tilted down out of the way as shown in FIG. 2; during the pinching part of the cycle, the burners are shut off and the pinching jaw brackets are first tilted up in front of the burners on opposite sides of the lower end of the quartz tube. The cross heads then move horizontally together in unison to cause the jaws to squeeze the white hot plastic quartz and form the pinch seal. The jaws are then withdrawn and thereafter tilted down to the rest position to await the next cycle of operation.

The tilting movement of the jaw brackets is effected through bell crank levers 50 pivotally mounted on cross heads 43. The bell crank levers are actuated by levers 51 and the latter are actuated by a single vertically reciprocating cross head 52 through link 53. Cross head 52 in turn is actuated by cam wheel 54 through a roller 55 fast to the cross head and which rides in a suitably curved channel 56 in the cam wheel. The horizontal translation of the cross head is effected through levers 57 which have slot and pin connections at their upper ends with the cross heads and are provided with rollers 58 at their lower ends which ride in suitably curved channels 59 in cam wheel 54. Cam wheel 54 is actuated by a double acting pneumatic cylinder 60 to which compressed air is admitted through supply tubes 61, 62. Piston rod 63 of the cylinder imparts a rotary movement to the cam wheel through a crank 64 to which it is connected by a link 65.

During the pinching cycle, compressed air is admitted first to the upper side of pneumatic cylinder 60 to impart a counter clockwise rotation to cam wheel 54, as indicated by arrow 66 in FIG. 2. Cam channel 56 is shaped to assure first the upward movement of cross head 52 in order to pivot the pinching jaws into their horizontal position. Cam channels 59 are shaped to maintain levers 57 stationary during initial rotation and thereafter actuate them to move the cross heads horizontally together in order to pinch the quartz tube. On the reverse stroke, compressed air is admitted through supply tube 62 to the lower side of pneumatic cylinder 60 causing the cam wheel to rotate clockwise and the jaws first to move apart and then to tilt down.

In accordance with the invention, the duration of the heating interval may be accurately controlled by means of a photoelectric pyrometer which is arranged to respond to the radiant energy radiated by the quartz tube proper as it is heated up. The system comprises a scanner unit 68 mounted on a standard 69 attached to a fixed part of the machine. The scanner unit comprises a phototube 70 responsive to radiant energy, for instance a phototube type 2022 (RCA) responsive to infrared energy and up into the visible range in the temperature range from 1000 to 5000° C. The field of sight of the phototube is restricted by means of apertures in the sight tube so that the entire field of view is centered well within bounds of the quartz that is to be heated. The sight tube is aimed at the heated portion of the quartz tube 4. The sight tube comprises a fixed part 71 attached to the scanner housing and a movable part 72 which is supported by means of a standard 73 and bracket 74 attached to the tilting frame member 38. The sight tube prevents faulty operation of the system as a result of room illumination or radiation from extraneous sources. The amount of radiation striking the phototube is controlled by means of an adjustable iris 75 interposed between the phototube and the inner end of sight tube 71.

Figure 4:
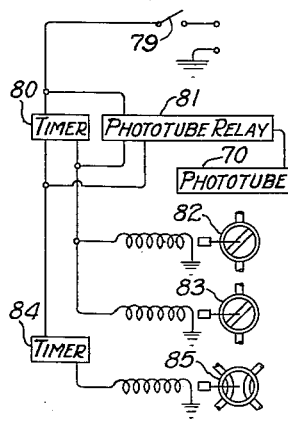
FIG. 4 is a schematic diagram illustrating the control system.

The operation of the heating and pinching mechanism may be controlled by the pyrometer through the system schematically illustrated in FIG. 4. During the dwell period of the turret, the heating and pinching mechanism is tilted into its vertical position. Provided a quartz tube is located between the jaws 5, the arms 6 will be spread further apart and a lever 78 (FIG. 2) supported on the pinching mechanism frame will be engaged by the corner of one of the arms and will in turn cause the actuation of control switch 79. Closure of switch 79 starts a first timer 80 and simultaneously actuates a solenoid valve 82 to increase the flow of nitrogen into the quartz tube, and another solenoid valve 83 to turn on the oxyhydrogen burners. As the end of the quartz tube becomes heated, the output of the phototube rises and at a predetermined level phototube relay 81 is actuated. Actuation of relay 81 shuts off solenoid valves 82 and 83 in order to reduce the nitrogen flow to normal to prevent blowing out of the now white hot plastic quartz, and to shut off the oxyhydrogen burners. At the same time a second timer 84 is started and simultaneously a four-way solenoid valve 85 is actuated to set pneumatic cylinder 60 in motion whereby to close the pinching jaws on the quartz tube. Timer 84 determines the delay interval before reverse actuation of four-way solenoid valve 85 for reopening the pinching jaws.

In the arrangement of FIG. 4, first timer 80 is set as an overriding control and does not operate unless for some reason or other phototube 70 or phototube relay 81 should fail. Timer 80 would then turn off the oxyhydrogen burners in any event after a predetermined time interval in order to prevent melting of the quartz tube in place and fouling of the jaws and spindle. The phototube is preferably focused on the quartz tube above the hottest zone of fire in order to achieve some delay and assure that the entire end of the quartz tube is suitably heated prior to the pinching operation. Also by this means the accuracy of operation of the pyrometer may be improved by causing the photocell relay to operate at a moment when the output of the phototube is climbing at a relatively rapid rate as determined by the temperature range in the region of the quartz tube on which the sight tube is focused.

Figure 5:
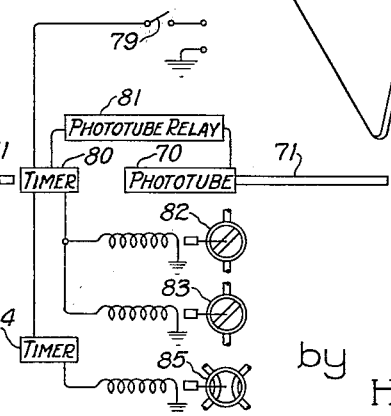
FIG. 5 is a schematic diagram of a variant of the control system.

FIG. 5 illustrates a variant of the control system according to the invention which may be used to achieve a longer time delay in the operation of the pinching jaws after the moment when the part of the quartz tube on which the phototube is focused has passed through the region of rapid climb in output. Closure of switch 79 causes actuation of solenoid valves 82 and 83 to increase the nitrogen flow and turn on the oxyhydrogen burners. When the output of phototube 70 has reached a predetermined level, phototube relay 81 starts timer 80. After a predetermined delay, for instance approximately 5 seconds, timer 80 turns off solenoid valves 82 and 83 and turns on second timer 84 simultaneously causing the actuation of four-way solenoid valve 85 to operate the pinching jaws. Timer 84 then causes reverse actuation of solenoid valve 85 to reopen the jaws after a preset time interval. This arrangement permits focusing the phototube on the hottest portion of the quartz tube and at the same time provides the necessary delay to allow the entire lower end of the quartz tube to be heated to plasticity before operation of the pinching jaws.

While the present invention has been described with particular reference to a specific preferred embodiment of same, the details of construction described are intended as exemplary and not in order to limit the invention thereto, except insofar as included in the appended claims.

What I claim as new and desire to secure by Letters Patent of the United States is:

1. In combination with apparatus for pinch sealing the ends of a quartz tube including means for holding a quartz tube and a heating and pinching mechanism including burners for directing flames on an end of said quartz tube and a pair of opposed pinching jaws normally positioned clear of said flames and adapted to close on said quartz tube end, a control system comprising a phototube arranged to respond substantially only to radiation from the heated end of said quartz tube and means controlled by said phototube for turning off said burners and actuating said pinching jaws when said radiation attains a predetermined level.

2. In combination with apparatus for pinch sealing the ends of a quartz tube including means for holding a quartz tube and a heating and pinching mechanism including burners for directing flames on an end of said quartz tube and a pair of opposed pinching jaws normally positioned clear of said flames and adapted to close on said quartz tube end, a control system comprising a phototube responsive to radiation in the range of temperature for sealing quartz, a sight tube substantially restricting the field of sight of said phototube to the heated end of said quartz tube, and means controlled by said phototube for turning off said burners and actuating said pinching jaws when said radiation attains a predetermined level.

3. In combination with a quartz tube pinch sealing machine comprising an indexing turret carrying a plurality of heads for holding a quartz tube vertically and a heating and pinching mechanism comprising burners for directing flames on the lower end of said quartz tube and a pair of opposed pinching jaws normally positioned clear of said flames, a control system comprising a phototube arranged to respond substantially only to radiation from the heated end of said quartz tube, and means controlled by said phototube for turning off said burners and actuating said pinching jaws by positioning them in alignment with the lower end of said quartz tube and moving them together when said radiation has attained a predetermined level.

4. In combination with apparatus for pinch sealing the ends of a quartz tube including means for holding a quartz tube and a heating and pinching mechanism including burners for directing flames on an end of said quartz tube and a pair of opposed pinching jaws normally positioned clear of said flames and adapted to close on said quartz tube end, a control system comprising a phototube arranged to respond substantially only to radiation from the heated end of said quartz tube, solenoid valves controlled by said phototube for turning off said burners and actuating said pinching jaws when said radiation attains a predetermined level, and an overriding relay for turning off said solenoid valves after a predetermined time interval in the event of failure of said phototube.

5. In combination with apparatus for pinch sealing the ends of a quartz tube including means for holding a quartz tube and a heating and pinching mechanism including burners for directing flames on an end of said quartz tube and a pair of opposed pinching jaws normally positioned clear of said flames and adapted to close on said quartz tube end, a control system comprising a phototube arranged to respond substantially only to radiation from the heated end of said quartz tube, a time delay relay controlled by said phototube and arranged to start when said radiation attains a predetermined level, and solenoid valves controlled by said relay to turn off said burners and actuate said pinching jaws at a predetermined time interval after starting of said time delay relay.

References Cited in the file of this patent

UNITED STATES PATENTS

| | | |
|---|---|---|
| 2,101,673 | Neuman | Dec. 7, 1937 |
| 2,116,450 | Richardson et al. | May 3, 1938 |
| 2,438,160 | Green | Mar. 23, 1948 |
| 2,698,501 | Peek et al. | Jan. 4, 1955 |
| 2,857,712 | Yoder et al. | Oct. 28, 1958 |
| 2,917,871 | Atkeson | Dec. 22, 1959 |